United States Patent [19]

Hawley

[11] 4,274,996
[45] Jun. 23, 1981

[54] THERMALLY STABILIZING POLYMERS OF ETHYLENE

[75] Inventor: Gil R. Hawley, Bartlesville, Okla.

[73] Assignee: Phillips Petroleum Company, Bartlesville, Okla.

[21] Appl. No.: 90,181

[22] Filed: Nov. 1, 1979

[51] Int. Cl.$^3$ .............................................. C08K 5/54
[52] U.S. Cl. ........................ 260/45.9 R; 260/45.7 R; 260/45.95 H
[58] Field of Search ...................... 260/45.7 R, 45.9 R

[56] References Cited

U.S. PATENT DOCUMENTS

| | | | |
|---|---|---|---|
| 3,641,087 | 2/1972 | Holman | 260/45.7 R |
| 3,644,245 | 2/1972 | Flanagan et al. | 260/45.7 R |
| 3,652,493 | 3/1972 | Stewart | 260/45.7 R |
| 3,723,402 | 3/1973 | Owen et al. | 260/45.7 R |
| 3,738,959 | 6/1973 | Savides et al. | 260/45.7 R |
| 3,808,172 | 4/1974 | Albarino et al. | 260/45.9 R |
| 3,823,114 | 7/1974 | Albarino et al. | 260/45.8 A |
| 3,991,131 | 11/1976 | Porter et al. | 260/45.9 R |
| 4,144,202 | 3/1979 | Ashcraft et al. | 260/45.8 A |

*Primary Examiner*—Maurice J. Welsh
*Assistant Examiner*—R. A. White

[57] ABSTRACT

A method for improving the thermal stability of polymer of ethylene having vinyl unsaturation in which the polymer is admixed with a stabilizing amount of a silane compound represented by the formulae $R_2SiA_2$ and $R_3SiA'$ in which each R is the same or different and is selected from aryl, alkaryl, or aralkyl groups containing from 6 to about 24 carbon atoms, each A is the same or different and is selected from hydrogen, azido, halogen, hydroxy, alkoxy groups in which the alkyl radical contains from 1 to about 10 carbon atoms, and alkenyl of 2 to 6 carbon atoms and one A can be lower alkyl of 1 to 6 carbon atoms with the other A selected from among azido, halogen, hydroxy, and alkoxy, lower alkyl and alkenyl as described above, and A' is selected from among halogen, hydrogen and hydroxy groups. The composition of matter produced thereby. A composition of matter containing a polymer of ethylene and a thermally stabilizing amount of a silane represented by the formulae $R_2SiA_2$ and $R_3SiA'$ in which each R is the same or different and is selected from aryl, alkaryl, or aralkyl groups containing from 6 to about 24 carbon atoms, each A is the same or different and is selected from hydrogen, azido, halogen, hydroxy, alkoxy groups in which the alkyl radical contains from 1 to about 10 carbon atoms, and alkenyl of 2 to 6 carbon atoms and one A can be lower alkyl of 1 to 6 carbon atoms with the other A selected from among azido, halogen, hydroxy, and alkoxy, lower alkyl and alkenyl as described above, and A' is selected from among halogen, hydrogen, and hydroxy groups.

7 Claims, No Drawings

THERMALLY STABILIZING POLYMERS OF ETHYLENE

BACKGROUND OF THE INVENTION

This invention relates to improving the thermal stability of polymers of ethylene. In one of its aspects, this invention relates to a composition of matter containing a polymer of ethylene and a thermal stabilizer. In another of its aspects, this invention relates to the use of certain silane compounds to provide thermal stabilization for polymers of ethylene.

It is known that polyethylene and copolymers of ethylene and other monoolefins are produced that contain a small amount of vinyl unsaturation. This vinyl unsaturation seems to cause an inherent thermal instability. At elevated temperature in the presence of oxygen, cross linking of the vinyl unsaturation is known to occur which results in a marked decrease in melt index of the polymer. It has now been found that the drop-off of melt index experienced upon heat treating these polymers can be improved, i.e., made less, by the incorporation of certain silane compounds with the polymers of ethylene.

It is therefore an object of this invention to provide a method for improving the thermal stability of polymers of ethylene. It is another object of this invention to provide compositions containing polymers of ethylene and silane compounds which exhibit improved thermal stability as compared to the same polymers of ethylene that have not been admixed with the silane compounds.

Other aspects, objects, and the various advantages of this invention will become apparent upon studying the specification and the appended claims.

STATEMENT OF THE INVENTION

According to this invention a method is provided for improving the thermal stability of polymers of ethylene having vinyl unsaturation by admixing with the polymers of ethylene a thermally stabilizing amount of a silane compound as described below.

In an embodiment of the invention a thermally stabilized composition containing a polymer of ethylene is produced by the method described above.

In another embodiment of the invention a composition of matter is provided containing a polymer of ethylene and a thermally stabilizing amount of a silane compound as described below.

The silane compounds which improve the thermal stability of the ethylene polymers utilized in this invention can be represented by the formulae:

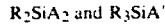

$R_2SiA_2$ and $R_3SiA'$ in which each R is the same or different and is selected from aryl, alkaryl, or aralkyl groups containing from 6 to about 24 carbon atoms, each A is the same or different and is selected from hydrogen, azido, halogen, hydroxy, alkoxy groups in which the alkyl radical contains from 1 to about 10 carbon atoms, and alkenyl of 2 to 6 carbon atoms and one A can be lower alkyl of 1 to 6 carbon atoms with the other A selected from among azido, halogen, hydroxy, and alkoxy, lower alkyl and alkenyl as described above, and A' is selected from among halogen, hydrogen and hydroxy groups. Combinations of A in which hydrogen and alkyl are both attached to the silicon along with the R groups result in compounds which are not as effective as the inventive silane compounds.

Specific examples of suitable silane compounds for use in forming the stabilized compositions of this invention include diphenylsilane, dibenzylsilane, diphenylsilanediol, diphenyldimethoxysilane, diphenyldidecyloxysilane, di-1-naphthylsilanediol, di(4-pentyl-1-naphthyl)silanediol, di(10-decyl-9-anthryl)silanediol, diphenyldichlorosilane, diphenyldiazidosilane, diphenyldivinylsilane, dibenzyldimethylsilane, diphenylmethylethoxysilane, diphenyldiallylsilane, diphenylvinylethoxysilane, triphenylchlorosilane, triphenylethoxysilane, triphenylsilanol, tri-o-tolylsilanol, and the like. The presently preferred compounds are selected from among diphenylsilanediol, diphenylmethyethoxysilane, diphenyldimethoxysilane, diphenylchlorosilane, diphenyldichlorosilane, and triphenylchlorosilane. Mixtures can also be employed.

The amount of silane compound required is that which provides an increase in thermal stability of the ethylene polymer. Although the addition of any amount of silane compound in a range above 0.05 g per 100 g polymer is considered as providing an increase in thermal stability of ethylene polymer, generally, the range employed is from about 0.05 to about 5 g per 100 g polymer for practical considerations. A preferred range is from about 0.10 to about 1 g per 100 g polymer.

The ethylene polymers utilized in this invention have vinyl unsaturation, containing from about 1 to 1.5 double bonds per 1000 carbon atoms. The unsaturation present in the polymers is of the terminal vinyl type as indicated by the intensity of the absorption bands of infrared spectrum at about 10.1 and 11.0 microns ($10.1 \times 10^{-6}$m, $11.0 \times 10^{-6}$m, respectively). More information concerning vinyl unsaturation and the nature of an infrared spectrum obtained from a typical ethylene polymer are discussed in U.S. Pat. No. 3,513,152 which is incorporated here by reference.

The normally solid ethylene polymers containing vinyl groups which are improved by this invention are homopolymers of ethylene or copolymers of ethylene with up to about 20 mole percent of another aliphatic mono-1-olefin containing from 3 to 10 carbon atoms. The polymers can be produced in any known polymerization reaction. Generally such polymerization takes place in a temperature range of 100° to 500° F. (38°–260° C.), more frequently from about 150° to 350° F. (66°–177° C.) since polymer yields are highest in this range. A presently more preferable temperature range is from 150° to 230° F. (66°–110° C.) so that the polymer particles form a suspension in the reaction mixture, i.e., a particle form process. At higher temperatures the polymer usually forms in solution, i.e., a solution process.

In a preferred method for producing polymers of ethylene for use in this invention contacting of monomer or monomers with chromium oxide-silica-containing catalysts is effected by any of the techniques known in the art. A convenient method, and presently the most preferred method, is to suspend the catalyst in a liquid diluent and to agitate the reaction mixture to maintain a suspension of the catalyst. Other known catalytic contacting methods such as fixed bed, fluidized bed, gravitating bed, etc., can also be used. Details of the general production of ethylene polymers and supported chromium oxide catalysts used therein are disclosed in U.S. Pat. No. 2,825,721. The production of ethylene polymers in a particle form process is discussed in U.S. Pat.

No. 3,624,063. Both these patents are incorporated herein by reference.

The particle form process is a process in which at least one aliphatic mono-1-olefin is polymerized at a temperature in the range of about 150°–230° F. The catalyst is kept in suspension and is contacted with the olefin or mixture of olefins in an organic medium at pressures sufficient to maintain the medium and at least a portion of the olefins in the liquid phase. The medium and temperatures are selected so that the polymer produced is insoluble in the medium and is recovered in the form of solid particles. The organic medium is generally a paraffin and/or cycloparaffin having from 3 to 12 carbon atoms per molecule. Representative examples include propane, butane, isobutane, pentane, isopentane, n-dodecane, cyclohexane, methylcyclohexane, and the like. The pressures can range from about 110 to about 700 psia (0.76–4.8 MPa) or higher and catalyst concentrations can range from about 0.001 to about 1 weight percent based on the weight of the reactor contents.

Hydrogen can be used to decrease the molecular weight of the polymers produced, if desired. Partial pressures of hydrogen can be within the range of about 20 to about 120 psia (0.14–0.83 MPa), more generally 40 to 90 psia (0.28–0.62 MPa).

Suitable catalysts for producing the ethylene polymers generally contain from about 0.1 to 10, preferably about 0.5 to 4 weight percent chromium calculated as chromium oxide ($CrO_3$) based on the weight of support plus chromium oxide. At least a portion of the chromium is present as hexavalent chromium at initial contact between catalyst and olefins.

The reason for the efficacy of the silane compounds of this invention in improving the thermal stability of the ethylene polymers is not completely understood. Since, as disclosed in U.S. Pat. No. 3,513,152, thermal stability of similar polymers is improved by hydrogenation of the vinyl groups, it is possible that at least part of the improvement can result from the addition of the silane compound across a portion of the vinyl groups in the polymer chains. However, infrared spectra obtained from the compositions of the instant invention are inconclusive in nature, possibly due to interference of some sort, and as a result, an unambiguous trend is not clear.

The silane compounds effectively increase thermal stability of the ethylene polymers processed at elevated temperatures in the presence of molecular oxygen. By elevated temperatures is meant those temperatures ranging from about 280° to about 600° F. (138°–316° C.) which can be employed in processing the polymers in such applications as extrusion, blow molding, injection molding, and the like. At such temperatures the molten polymers tend to show a decrease in flow characteristics when they are retained at elevated temperatures for times ranging from about 3 to 30 minutes or longer. The decrease in flow is known as melt index drop-off. A convenient way of measuring melt flow is the determination of its melt index value according to ASTM D 1238-65T, condition E.

The silane compound can be incorporated in the polymer by any suitable mixing means that insure thorough and uniform distribution of components. The silane compound can be dissolved or slurried in a solvent that is inert in the process such as hydrocarbon, e.g., n-hexane, cyclohexane, benzene, and the like. The resulting combination is then mixed with the polymer by tumbling, shaking, etc., after which the solvent is evaporated. The product can then be passed through an extruder, Brabender mixer, Banbury mixer, roll mill, and the like to further homogenize it or it can be processed directly into the final product, e.g., film, bottles, molded goods, etc. Alternatively, the silane compound can be added, either neat or as a solution, to the polymer as it is processed in molten form in a mixing means.

The effect of the silane compound or admixture with a polymer can be studied by maintaining the mixture at a temperature above the melting point of the polymer for an extended time, periodically taking samples from the melt, and determining the melt index of the sample. One convenient method is to mill the mixture on a heated two roll mill for a suitable period of time, e.g., 5 minutes, thoroughly to mix the components in the presence of air and remove and cool the composition. The product can then be chopped or granulated and a portion of it can be charged to a melt indexer as described in ASTM D 1238-65T. Melt index can be determined for the composition after it has experienced a relatively short heat history, e.g., about 6.7 minutes (about 400 seconds) and a relatively long heat history, e.g, about 30 minutes (1800 seconds). The less the melt index drop-off noted between these test limits the more effective the silane compound is as a stabilizing component.

EXAMPLE 1

A series of compositions was prepared by individually admixing a specified amount of silane compound dissolved in 50 ml of n-heptane or cyclohexane with the ethylene polymer (about 100 g) contained in a jar by vigorously shaking the jar. The amount of silane compound is expressed in terms of weight percent in the results based on the weight of the neat compound and compound plus polymer. The ethylene polymer employed was an ethylene/1-hexane copolymer having a nominal melt index of about 0.8 as determined by ASTM D 1238-65T, condition E, and a density of about 0.942 g/cc as determined by ASTM D 1505-68. The polymer was in the form of particles as made in a particle form polymerization process employing a supported chromium oxide catalyst and it was admixed with about 0.02 weight percent 2,6-di-ti-butyl-4-methylphenol (BHT) as a transient antioxidant. By transient antioxidant is meant that just sufficient BHT was added to the reactor product fluff (particulate polymer) to protect the polymer and allow it to be processed under mild conditions, e.g., about 375° F. (190° C.) for no longer than about 5 minutes, without exhibiting more than about 10 to 20 percent melt index drop-off. After the initial processing step, the polymer is essentially unprotected from the deleterious effects of heat and oxygen absent addition of a suitable primary stabilizing system. After allowing the solvent to evaporate each composition was placed on a heated two roll mill and milled for 5 minutes while in a molten state. The melt temperature of the milled compositions as determined by means of a needle pyrometer generally ranged from about 320°–340° F. (160°–170° C.). Following milling each composition was stripped off, cooled, and granulated, An appropriate amount of the granulated product was charged to the melt indexer and its melt index determined at 190° C. after 400 seconds and after 1800 seconds at this temperature.

The nature and weight percent of each silane compound employed and the results obtained are presented in Tables 1A and 1B.

TABLE 1A

Invention Silanes
Effect on Polymer Melt Index Dropoff

| Run No. | Silane Compound Name | Weight % | Polymer Melt Index After 400 Seconds | Polymer Melt Index After 1800 Seconds | Dropoff % | Remarks |
|---|---|---|---|---|---|---|
| 1 | None | — | 0.93 | 0.47 | 49 | control |
| 2 | diphenylsilanediol | 5.0 | 1.30 | 1.33 | −2.3 | invention |
| 3 | triphenylsilanol | 1.0 | 0.94 | 0.78 | 17 | " |
| 4 | diphenylmethylethoxysilane | 1.0 | 0.89 | 0.94 | −5.6 | " |
| 5 | " | 0.5 | 0.84 | 0.68 | 19 | " |
| 6 | diphenyldimethoxysilane | 1.0 | 0.79 | 0.95 | −20 | " |
| 7 | diphenylmethylazidosilane | 1.0 | 0.98 | 0.95 | 3.1 | " |
| 8 | " | 0.5 | 0.86 | 0.73 | 15 | " |
| 9 | diphenyldiazidosilane | 1.0 | 1.0 | 0.83 | 17 | " |
| 10 | " | 0.5 | 0.76 | 0.70 | 7.9 | " |
| 11 | diphenyldivinylsilane | 1.0 | 1.3 | 1.1 | 15 | " |
| 12 | " | 0.5 | 1.2 | 1.1 | 8.3 | " |
| 13 | " | 0.1 | 0.99 | 0.77 | 22 | " |
| 14 | " | 0.01 | 0.90 | 0.49 | 46 | control |
| 15 | diphenylchlorosilane | 1.0 | 1.6 | 1.5 | 6.3 | invention |
| 16 | " | 0.5 | 1.5 | 1.5 | 0 | " |
| 17 | " | 0.1 | 0.69 | 0.51 | 26 | " |
| 18 | " | 0.01 | 1.1 | 0.63 | 43 | control |
| 19 | diphenyldichlorosilane | 1.0 | 0.95 | 0.03 | 2.1 | invention |
| 20 | " | 0.5 | 0.78 | 0.64 | 17 | " |
| 21 | " | 0.1 | 1.2 | 1.2 | 0 | " |
| 22 | " | 0.01 | 0.83 | 0.50 | 40 | control |
| 23 | triphenylchlorosilane | 1.0 | 1.2 | 1.0 | 8.3 | invention |
| 24 | " | 0.5 | 1.1 | 1.1 | 0 | " |
| 25 | " | 0.1 | 0.75 | 0.71 | 5.3 | " |
| 26 | " | 0.01 | 0.93 | 0.67 | 30 | control |

TABLE 1B

Control Silane
Effect On Polymer Melt Index Dropoff

| Run No. | Silane Compound Name | Weight % | 400 Seconds | 1800 Seconds | Dropoff % |
|---|---|---|---|---|---|
| 27 | methylphenylsilane | 1.0 | 0.95 | 0.52 | 45 |
| 28 | diphenylmethylsilane | 1.0 | 1.0 | 0.64 | 36 |
| 29 | dimethylethoxysilane | 1.0 | 0.88 | 0.57 | 35 |
| 30 | methyldimethoxysilane | 1.0 | 0.84 | 0.53 | 37 |
| 31 | dimethyldiazidosilane | 1.0 | 0.80 | 0.56 | 30 |
| 32 | tris(dimethylamino)silane | 1.0 | 0.77 | 0.40 | 48 |
| 33 | tetravinylsilane | 1.0 | 1.3 | 0.75 | 42 |

The results presented in Tables 1A and 1B demonstrate the effects obtained on polymer melt index drop-off with compositions containing invention silanes or silanes not operable in this invention. Inoperable silanes or operable silanes used outside the lower limit prescribed, when admixed with the described ethylene polymers, yield compositions that exhibit melt index drop-off values of about 30 percent or more. The approximate value of 30 percent has been arbitrarily selected as indicating the baseline for separating desirable compositions from undesirable compositions. The invention compositions actually exhibit melt index drop-off values ranging from 26 percent, the upper limit shown in run 17 to −20 percent, the lower limit shown in run 6. The minus value signifies that the silane compound employed actually increases the melt index (melt flow) of the composition over the holding period at 190° C. from 400 seconds to 1800 seconds.

As control runs 14, 18, 22, and 26 of Table 1A show, when invention silane compounds are employed at about 0.01 weight percent, the resulting compositions still exhibit excessive melt index dropoff. When the same compounds are employed at 0.1 weight percent, acceptable melt index dropoff values are shown. The lower, operable limit for these silane compounds has, therefore, been determined to be about 0.05 weight percent. Invention run 2 shows that 5 weight percent of the silane compound gives good results. Levels exceeding 5 weight percent of invention silane compounds are indicated by the data to give good results, but the relative expense involved would be excessive and, therefore, commercially unacceptable.

As Table 1A shows, all operable silane compounds have 2 or 3 phenyl groups attached to each silicon atom. The results obtained in control run 28 of Table 1B are the basis for excluding those silane compounds which have a hydrogen atom and an alkyl group attached to the silicon atom as well as two aryl, alkaryl or aralkyl groups.

The results presented in Table 1A demonstrate that the described invention silane compounds provide good thermal stability with ethylene polymers containing from about 1 to 1.5 terminal vinyl groups per 1000 carbon atoms.

I claim:

1. A method for improving the thermal stability of polymers of ethylene having vinyl unsaturation, said method comprising admixing with said polymers of ethylene a thermally stabilizing amount of a silane compound represented by the formula $R_2SiA_2$ or $R_3SiA'$ in which each R is the same or different and is selected from aryl, alkaryl, or aralkyl groups containing from 6 to about 24 carbon atoms, each A is the same or different and is selected from hydrogen, azido, halogen, hydroxy, alkoxy groups in which the alkyl radical contains from 1 to about 10 carbon atoms, and alkenyl of 2 to 6 carbon atoms also in which one A can be lower alkyl of 1 to 6 carbon atoms with the other A selected from among azido, halogen, hydroxy, alkoxy, lower alkyl and alkenyl as described above, and A' is selected from among halogen, hydrogen and hydroxy groups.

2. A method of claim 1 in which the amount of silane is in a range of about 0.05 to about 5 g per 100 g polymer.

3. A method of claim 1 wherein said ethylene polymers containing vinyl groups are homopolymers of ethylene or copolymers of ethylene with up to 20 mole percent of another aliphatic mono-1-olefin containing from about 3 to about 10 carbon atoms.

4. A thermally stabilized composition produced by the method of claim 1.

5. A composition of matter comprising a polymer of ethylene and a thermally stabilizing amount of a silane compound represented by the formula $R_2SiA_2$ or $R_3SiA'$ in which each R is the same or different and is selected from aryl, alkaryl, or aralkyl groups containing from 6 to about 24 carbon atoms, each A is the same or different and is selected from hydrogen, azido, halogen, hydroxy, alkoxy groups in which the alkyl radical contains from 1 to about 10 carbon atoms, and alkenyl of 2 to 6 carbon atoms, and wherein one A being selected from lower alkyl of 1 to 6 carbon atoms the other A is selected from among azido, halogen, hydroxy, and alkoxy, lower alkyl and alkenyl as described above, and A' is selected from among halogen, hydrogen and hydroxy groups.

6. A composition of matter of claim 5 wherein said silane compound is present in an amount in the range of about 0.05 to about 5 g per 100 g polymer.

7. A composition of matter of claim 5 wherein said ethylene polymers containing vinyl groups are homopolymers of ethylene or copolymers of ethylene with up to about 20 mole percent of another aliphatic mono-1-olefin containing from about 3 to about 10 carbon atoms.

* * * * *